Sept. 13, 1932.  F. M. DAVIS  1,877,278
BEET TOPPER AND HARVESTER
Filed June 30, 1930  5 Sheets-Sheet 2

INVENTOR.
Frank M. Davis,
BY
Morsell, Keeney & Morsell
ATTORNEYS

Sept. 13, 1932.  F. M. DAVIS  1,877,278
BEET TOPPER AND HARVESTER
Filed June 30, 1930   5 Sheets-Sheet 3
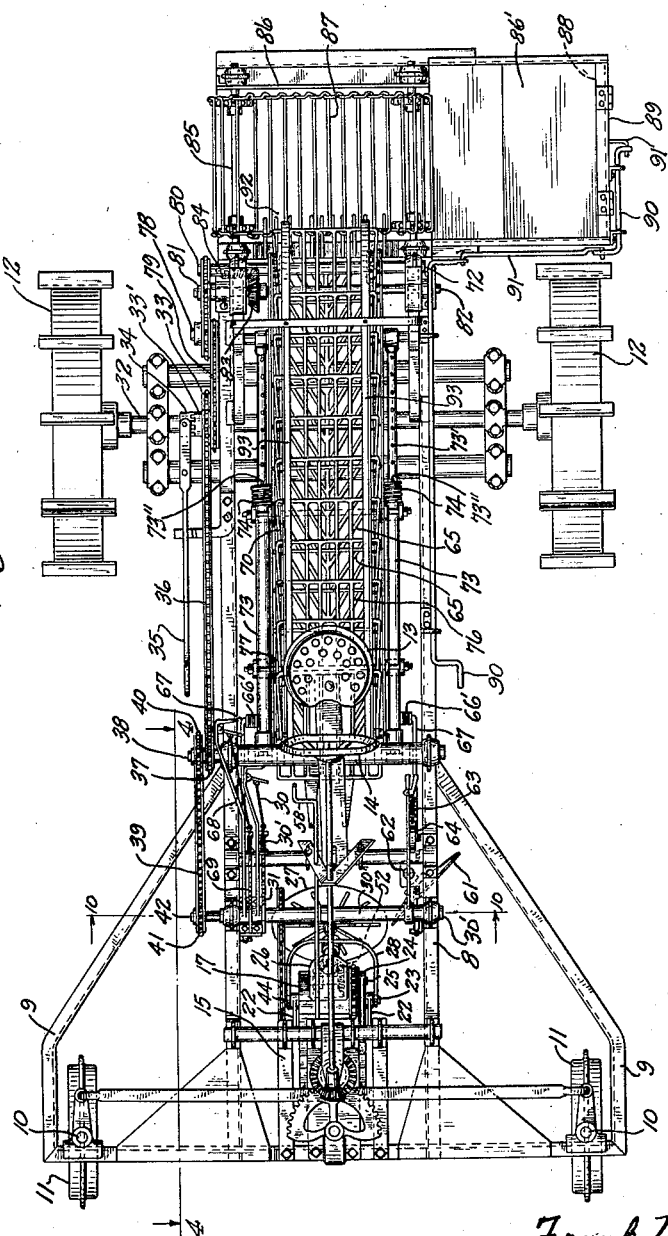
Fig. 3.
INVENTOR.
Frank M. Davis,
BY
ATTORNEYS

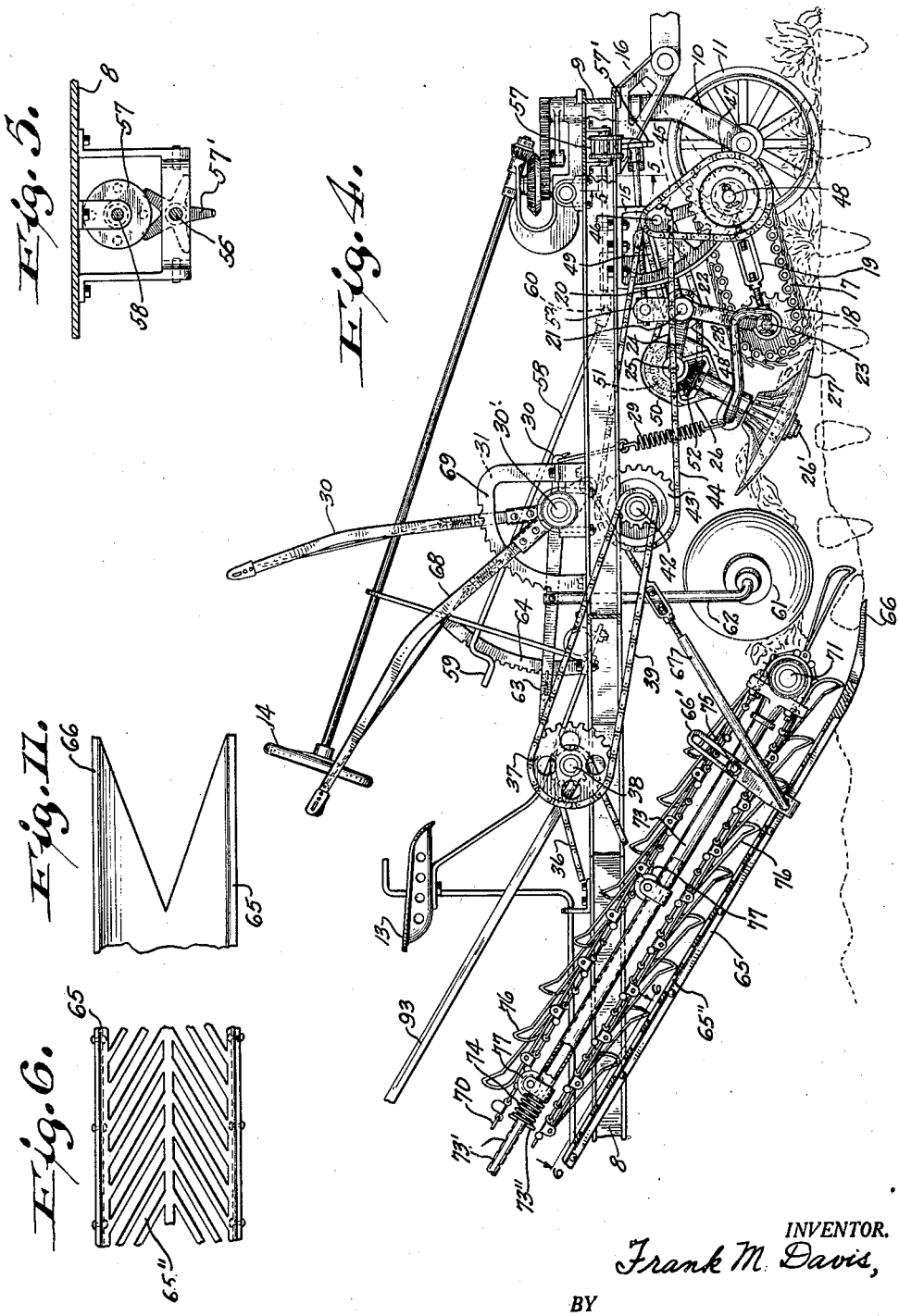

Sept. 13, 1932.  F. M. DAVIS  1,877,278
BEET TOPPER AND HARVESTER
Filed June 30, 1930  5 Sheets-Sheet 5
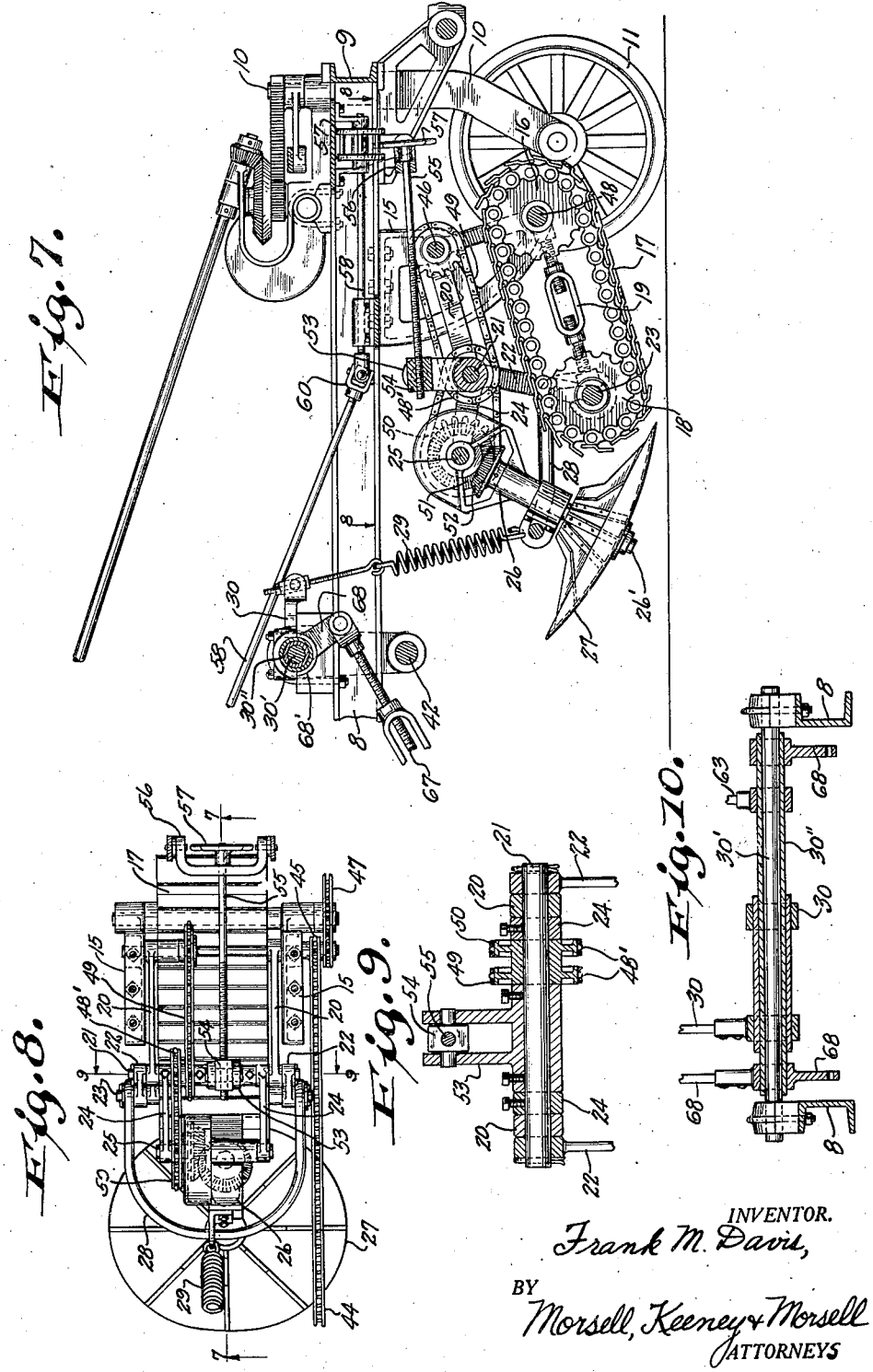
INVENTOR.
Frank M. Davis,
BY
Morsell, Keeney & Morsell
ATTORNEYS Patented Sept. 13, 1932

1,877,278

UNITED STATES PATENT OFFICE

FRANK M. DAVIS, OF MILWAUKEE, WISCONSIN

BEET TOPPER AND HARVESTER

Application filed June 30, 1930. Serial No. 464,963.

This invention relates to improvements in beet toppers and harvesters.

It is one of the objects of the present invention to provide a beet topper and harvester in which means are provided for folding and holding the tops of the beets in a position to permit easy severing of the tops from the beets.

A further object of the invention is to provide a beet topper and harvester in which the angle of the device for severing the tops from the beets may be easily adjusted while the machine is in operation to meet varying conditions.

A further object of the invention is to provide a beet topper and harvester in which the device for severing the tops from the beets is formed with means for deflecting the severed tops to one side of the path of travel of the machine to permit the simultaneous harvesting of the beets.

A further object of the invention is to provide a beet topper and harvester in which a means is provided for positively deflecting the severed tops away from the path of travel of the beet gatherer.

A further object of the invention is to provide a beet topper and harvester in which the device for severing the tops from the beets and the endless chain tractor device controlling the depth of the cutting may be elevated to an out of the way position to permit traveling along the roads to points of use.

A further object of the invention is to provide a beet topper and harvester having means for digging the beets out of the ground after the tops have been removed and then cleaning the beets while they are being elevated to the receiving receptacle carried by the machine.

A further object of the invention is to provide a beet topper and harvester in which an endless chain traction means automatically controls the vertical height of cut of the device for severing the tops from the beets.

A further object of the invention is to provide a beet topper and harvester in which the elevating baskets and slotted trough are so combined as to roll the beets while being elevated to clean all of the foreign matter therefrom.

A further object of the invention is to provide a beet topper and harvester having various controls for the different adjustments of the machine arranged in close proximity to the operator's seat on the machine so they can be easily adjusted while the machine is in operation.

A further object of the invention is to provide a beet topper and harvester which is of simple construction, is strong and durable and is well adapted for the purpose described.

With the above and other objects in view, the invention consists of the improved beet topper and harvester and its parts and combinations as set forth in the claims, and all equivalents thereof.

In the accompanying drawings in which the same reference characters indicate the same parts in all of the views:

Fig. 3 is a top view of the beet topper and harvester;

Fig. 4 is a vertical longitudinal sectional view thereof on a larger scale, taken on line 4—4 of Fig. 3;

Fig. 5 is a detail vertical sectional view taken on line 5—5 of Fig. 4;

Fig. 6 is a sectional detail view taken on line 6—6 of Fig. 4;

Fig. 7 is a longitudinal sectional detail view taken on a larger scale on line 7—7 of Fig. 8;

Fig. 8 is a horizontal sectional detail view taken on line 8—8 of Fig. 7;

Fig. 9 is a transverse sectional detail view taken on line 9—9 of Fig. 8;

Fig. 10 is a vertical transverse sectional detail view, taken on a larger scale, on line 10—10 of Fig. 3; and Fig. 11 is a top detail view of the lower end of the inclined trough.

Figure 1:
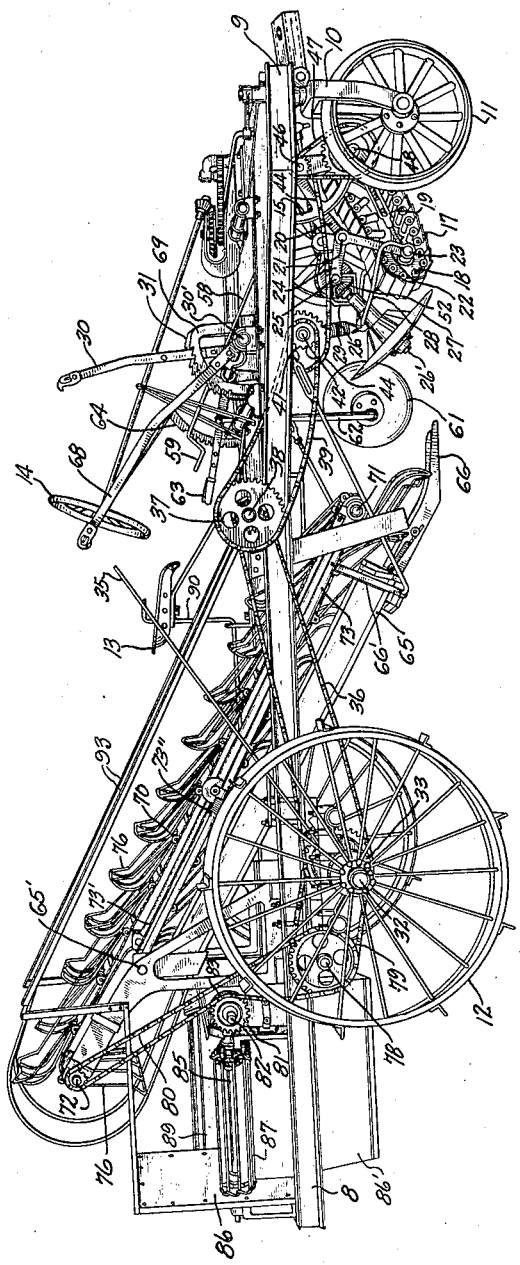
Fig. 1 is a side perspective view of the improved beet topper and harvester.
Figure 2:
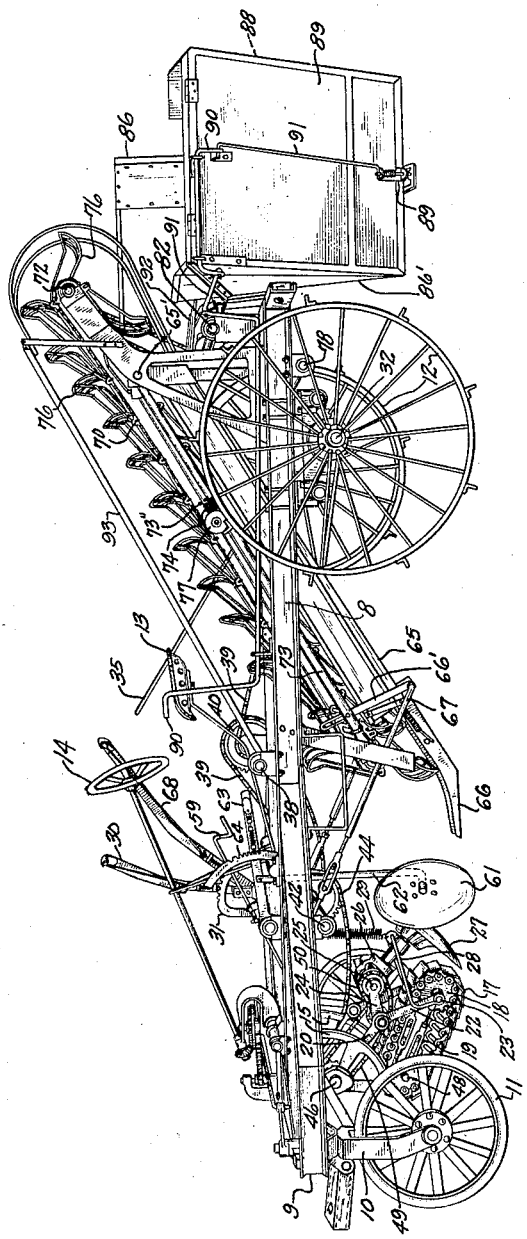
Fig. 2 is a similar view of the opposite side of the machine.

Referring to the drawings the reference numeral 8 indicates the main frame of the topper and harvester, which at its forward portion 9 is diverged laterally outwardly to receive the steering fork heads 10 of steering wheels 11 connected thereto. Traction wheels 12 support the rear portion of the frame. A seat 13 is mounted on a medial portion of the frame and the steering control wheel 14 which is connected to the steering fork heads, extends to a position adjacent the seat.

Positioned beneath and adjacent the medial forward portion of the frame is a pair of spaced depending brackets 15 between which is journaled a pair of sprocket wheels 16 having a tractor type endless chain 17 journaled thereon. The rearwardly and downwardly extending other end portion of the chain extends around a pair of sprocket wheels 18 which are journaled between and carried by rearwardly extending adjustable arms 19. Said arms 19 at their forward ends are pivotally connected to the lower end portions of the depending brackets 15 and are arranged to permit the rear end portion of the tractor chain to be adjusted vertically. Rearwardly extending spaced arms 20 are pivotally connected to the brackets 15 above the pivotal connection of the adjustable arms 19 with said brackets. A short transverse shaft 21 is mounted in the outer ends of the arms 20 and other link arms 22 pivotally connected to the short shaft 21 depend downwardly therefrom and are pivotally connected to the second transverse shaft 23 of the adjustable arms. The brackets, the adjustable arms, link arms and the depending arms form, in substance, a parallelogram connection and support for the endless chain beet top holder to permit the rear end of the endless chain beet top holder to swing vertically. Rearwardly extending spaced arms 24 pivotally connected to and extending rearwardly from the second transverse shaft 21 have a third transverse shaft 25 mounted in their rear end portions. A cutter shaft yoke 26 pivotally connected to the third transverse shaft 25 extends downwardly rearwardly therefrom and has a cutter shaft 26′ journaled therein which is provided wtih a disk cutter 27 at its lower end. Said cutter extends obliquely with respect to a horizontal plane. A U-shaped link or bail 28 also pivotally connects the cutter shaft yoke 26 to the second transverse shaft 23. To yieldingly support the rearward end portion of the endless chain beet top holder and the disk cutter from the frame a coiled spring 29 connected at its lower end to the yoke 26 extends upwardly therefrom and at its upper end is attached to the short end of a control lever 30 fulcrumed on the frame. The long end of the control lever 30 extends upwardly to a position convenient for the operator controlling the machine. When the lever is in upright position the holder and cutter are supported adjacent the ground and when the lever is in a horizontal position the parts mentioned will be in their upper position to permit traveling over the road. To permit placing the lever 30 in a convenient position for the operator the long end portion is fulcrumed on the transverse lever tube 30″ and is offset from the short end as indicated in Figs. 3 and 10 of the drawings. The lever is provided with an ordinary spring dog which engages the rack teeth of a segmental bar 31 mounted on the frame.

The transverse blades of the endless chain holder are so shaped and pivoted to the carrying chains that in extending around the sprocket wheels 18, they will swing radially outwardly to better engage the tops of the beets and bend them forwardly and downwardly and to hold them in said position until cut by the disk cutter.

One of the tractor wheels 12 serves as the driving means for the mechanism of the machine and is rigidly connected to the rear axle 32 upon which is journaled a sprocket wheel 33 having a side clutch face 33′. A slidable clutch member 34 keyed on the shaft 32 is arranged to be moved into clutching engagement with the sprocket wheel 33 by the clutch lever 35 which is fulcrumed on the frame and extends to a position adjacent the seat 13. A sprocket chain 36 extending around the sprocket wheel 33 and also upwardly at an angle engages a sprocket wheel 37 mounted on a transverse shaft 38 journaled on the upper side portion of the frame 9. Another sprocket chain 39 extending around a sprocket wheel 40 which is mounted on the same transverse shaft 38 extends to and engages a smaller sprocket wheel 41 mounted on an intermediate transverse shaft 42 journaled beneath the frame 9. Said smaller sprocket wheel 41 is positioned on one side of the frame and on the same shaft 42 intermediate the side members of the frame is mounted a larger sprocket wheel 43 which is engaged by a sprocket chain 44. The sprocket chain 44 extends around a smaller sprocket wheel 45 mounted on the shaft 46 to which the arms 20 are pivotally connected. The shaft 46 has a sprocket chain and wheel connection 47 with the shaft 48 upon which the endless chain sprocket wheels 16 are mounted and are driven thereby.

A double or two-connected-together sprocket wheel 48′ journaled on the short shaft 21 has a sprocket wheel and chain driving connection 49 with the shaft 46 and a similar connection 50 with the third transverse shaft 25. Bevel gears 51 and 52 transmit motion from the third transverse shaft 25 to the cutter shaft 26′ and its knife 27 in all positions of adjustment of the parts.

To adjust the angle of the disk cutter with relation to the endless chain tractor, the shaft of the cutter is supported by the parts 22, 24, 26 and 28 which in substance, form a parallelogram connection with the parallelogram support of the endless chain tractor before mentioned, and the arms 24 forming part of the cutter parallelogram are rigidly connected to the short shaft 21 which in turn is provided with an upstanding bifurcated arm 53 rigidly connected thereto. A nut 54 fulcrumed between the bifurcations is engaged by a threaded rod 55 and the forward portion of said rod extends through and is journaled in a pivot bearing 56 and at its forward end the rod is provided with a star gear 57' which is in mesh with a pin gear 57 to also permit a slidable engagement between the two. The pin gear 57 is mounted on the forward end of a jointed rod 58 and the rearward end of said rod terminates in front of the operator and is formed with a cranked end 59 for convenience in turning the same. The jointed connection 60 between the two rod parts is in the form of a universal joint to permit the angular relation between the two rod parts and the rotation of the rod to adjust the relative angular position of the cutter.

A concavo-convex deflecting disk 61 journaled on the lower end of a rod 62 is positioned to one side of and adjacent the rear part of the cutter for deflecting the beet tops severed by the cutter to one side of the line of beets being topped and to one side of the beet digger and elevator to be later described. The deflecting disk rod 62 extends upwardly through a portion of the frame 8 and at its upper end is pivotally connected to a lever 63 which is fulcrumed on the lever shaft 30'. Said lever is provided with the ordinary spring dog which engages the teeth of the segmental rack 64 extending upwardly from the frame 8 to permit adjusting the height of the deflector disk 61.

An inclined trough or chute 65 having a pivotal connection 65' at its upper end to the rear portion of the frame 8, inclines downwardly and forwardly therefrom and at its forward end is formed with a horizontal bifurcated portion 66 having pointed ends for loosening and digging up the beets from the ground. The trough is formed with herring-bone shaped openings or perforations 65" for scraping off the dirt from the beets while they are being rolled upwardly on the trough. The lower free end of the trough is provided with upwardly extending slotted side members 66' to which turnbuckle rods 67 are connected. The upper ends of the turnbuckle rods are connected to the short ends of an elevating lever 68 formed in part of the sleeve 30" which surrounds and is fulcrumed on the shaft 30' for lifting the forward end of the perforated trough 65. This lever is also provided with an ordinary spring dog which engages the segmental rack 69 to hold the trough in adjusted position.

An endless conveyor 70 positioned directly above the trough 65 is supported upon sprocket wheels and shafts 71 and 72 on a conveyor frame 73 which in turn is pivotally connected at its upper end to the trough pivot 65'. Said conveyor frame 73 is formed in two sections and of tubes which telescope each other to adjust the tension of the conveyor chains 70. To permit adjustment of the length of the frame the smaller tubes are formed with spaced openings 73' for receiving pins 73" which are engaged by coiled springs 74. The coiled springs surround the smaller tubes and are interposed between the pins 73" and the inner ends of the larger tubes of the conveyor frame to adjustably and yieldingly hold the conveyor under tension. The lower portion of the conveyor frame is connected to the slotted portions of the side members 66' by pins 75 to permit free movement upwardly to a limited extent, when larger beets are engaged by the conveyor. The conveyor is provided with basket shaped wire flights 76 to engage the beets and elevate them along the trough while permitting the dirt and other foreign matter to sift through the basket flights and the perforations of the trough 65. The conveyor frame is provided with rollers 77 to support the upper stretch of the conveyor.

A transverse countershaft 78 journaled beneath the frame 8 has a sprocket chain and wheel connection 79 with the rear axle 32 and the sprocket wheel 33 and is driven thereby. The countershaft 78 also has a sprocket chain and wheel connection 80 with the upper conveyor shaft 72 to drive the said conveyor. The chain connection also engages and drives a sprocket wheel 81 which is mounted on a transverse countershaft 82 journaled on a rear portion of the frame 8. The transverse countershaft 82 is also provided with a bevel gear 83 which is in mesh with and drives a bevel gear 84 mounted on a longitudinally extending conveyor shaft 85. A rectangular beet receptacle 86 mounted on the rear end of the frame 8 extends around the longitudinal shaft 85 and also around a horizontal transverse conveyor 87. The transverse conveyor extends beneath the upper end portion of the basket conveyor 70 to receive the beets discharged therefrom and move them towards the downwardly inclined fixed bottom portion 86' and to the side discharge opening 88 of the receptacle. A hinged side cover 89 closes the side opening 88 and is held in closed position by a spring latch 89 and said latch is controlled from the operator's seat by cranked rods and links 90 and 91 to permit discharging the load to one side of the path of travel of the harvester as desired. One of the cranked rods 90 extends to a position adjacent the seat 13.

Deflector rods 92 positioned below the upper end of the basket conveyor 70 and above the transverse conveyor 87 are provided to prevent beets from dropping and lodging between the said parts.

Spaced guard rods 93 positioned above the basket conveyor 70 and extending around and beneath the upper end portion of the basket conveyor prevent accidental contact with the conveyor.

In use the endless chain tractor 17 and the cutter 27 are adjusted to the desired height, and likewise the forward bifurcated end of the trough. The machine is then pulled along a field in line with the growing beets which will cause the rear wheels to transmit motion to different portions of the machine. The endless chain tractor by virtue of its rear end coaction with the ground will move in a clockwise direction as viewed in Figs. 4 and 7, thereby first bending the tops of the beets forwardly and subsequently folding the tops back and holding them while the rotary cutter is severing the leaves or tops close to the upper ends of the beets. The deflector blade 61 will direct the cut tops to one side of the path of travel of the machine. Simultaneously with this movement the forward bifurcated end of the trough is being forced forwardly below the surface of the ground and serves to break up the ground between the cutter and the said trough end so that when the trough end reaches each beet it will be easily dislodged from the earth. The forked end of the trough will direct the beets into the path of travel of the basket conveyor and said beets will be elevated thereby and while moving upwardly they will be rolled along the angularly slotted portions of the trough and the earth removed therefrom. The open formation of the wire baskets also aids in dislodging the dirt from the beets. When the beets reach the upper end of the trough they will drop upon the transverse conveyor 87 and be moved thereby toward the downwardly inclined bottom portion 86' and the discharge opening 88. When the discharge end portion of the receptacle is filled with beets the operator can turn the cranked rod 90 to release the cover 89 and the weight of the beets will force the cover open and the beets will be discharged from the receptacle as desired. When discharged the cover will swing to closed position.

From the foregoing description it will be seen that the beet topper and harvester is well adapted for the purpose described.

What I claim as my invention is:

1. A beet topper and harvester, comprising a vehicle, an inclined slotted trough carried by the vehicle and having a lower forward end portion for dislodging the beets from the ground, an endless means having open baskets coacting with the trough for elevating beets to the upper end portion of the trough, a receptacle carried by the vehicle for receiving the beets from the trough, and means actuated by the travel of the vehicle for rotating the endless means.

2. A beet topper and harvester, comprising a vehicle, a cutter carried by the vehicle for severing the leaves from the beets, an inclined slotted trough carried by the vehicle and having a lower forward end portion extending toward and movable in the path of travel of the cutter for dislodging the beets from the ground after removal of the tops by the cutter, an endless conveyor means having wire basket flights coacting with the trough for engaging and elevating the dislodged beets to the upper end portion of the trough, a receptacle carried by the vehicle for receiving the beets from the trough, and means actuated by the travel of the vehicle for rotating the cutter and the conveyor.

3. A beet topper and harvester, comprising a vehicle, a cutter for severing the leaves from the beets while the leaves are in folded position, an inclined slotted trough carried by the vehicle and having a lower forward end portion extending toward and movable in the path of travel of the cutter for dislodging the beets from the ground after removal of the tops by the cutter, an endless conveyor means having wire basket flights coacting with the trough for engaging and elevating the dislodged beets to the upper end portion of the trough and for discharging the beets therefrom, a receptacle carried by the vehicle and positioned below the upper end of the trough, a conveyor within the receptacle for receiving the beets from the trough and moving them transversely to the discharge side of the receptacle, and means actuated by the travel of the vehicle for rotating the cutter and the conveyors.

4. A beet topper and harvester, comprising a vehicle having a seat, a disk cutter carried by said vehicle, means for raising and lowering the disk cutter, an inclined perforated trough carried by the vehicle and having a lower forward end portion extending toward and movable in the path of travel of the cutter for dislodging the beets from the ground after removal of the tops by the cutter, an endless conveyor means having wire basket flights coacting with the slotted trough for engaging, cleaning and elevating the beets to the upper end portion of the trough to a point of discharge, a receptacle carried by the vehicle, a conveyor within the receptacle for receiving and transversely moving beets discharged from the trough to a point of discharge, means for raising and lowering the lower end portion of the trough, and means actuated by the travel of the vehicle for rotating the cutter and the conveyors.

5. A beet topper and harvester, comprising a vehicle, an obliquely extending disk cutter carried by said vehicle for severing the leaves from the beets while the leaves are in folded position, an inclined slotted trough carried by the vehicle and having a lower forward end portion extending toward and movable in the path of travel of the cutter for dislodging the beets from the ground after removal of the tops by the cutter, a disk means between said cutter and said trough for deflecting the severed leaves away from the path of travel of the lower trough end, an endless conveyor means having wire basket flights coacting with the trough for engaging and elevating the dislodged beets to the upper end portion of the trough, a receptacle carried by the vehicle for receiving the beets from the trough, and means actuated by the travel of the vehicle for rotating the cutter and the conveyor.

In testimony whereof I affix my signature.

FRANK M. DAVIS.